United States Patent [19]

Harris et al.

[11] 3,860,534

[45] Jan. 14, 1975

[54] METHOD OF MAKING AN ANTIMONY-VANADIUM CATALYST

[75] Inventors: Norman Harris, Stockton-on-Tees; Frederick Joseph Flintoff, Tollesvy; Robert Reid, Great Sankey, near Warrington, all of England

[73] Assignee: Power-Gas Limited, Teesside, England

[22] Filed: Mar. 13, 1972

[21] Appl. No.: 234,309

[30] Foreign Application Priority Data
Mar. 24, 1971  Great Britain...................... 2681/71
Dec. 17, 1971  Great Britain.................... 58745/71

[52] U.S. Cl................................ 252/461, 260/465.3
[51] Int. Cl............................................. B01j 11/06
[58] Field of Search.................. 252/461; 260/465.3

[56] References Cited
UNITED STATES PATENTS

| | | |
|---|---|---|
| 3,094,565 | 6/1963 | Bethell et al..................... 252/461 X |
| 3,326,819 | 6/1967 | Newman............................ 252/461 |
| 3,358,020 | 12/1967 | Hendrickx....................... 252/461 X |
| 3,475,350 | 10/1969 | Winnick et al. ................ 252/461 X |
| 3,579,574 | 5/1971 | Vander Meer.................. 252/461 X |
| 3,627,817 | 12/1971 | Barnett et al.................... 260/465.3 |
| 3,686,267 | 8/1972 | Taylor.............................. 260/463.3 |
| 3,709,829 | 1/1973 | Gasson.............................. 252/461 |

FOREIGN PATENTS OR APPLICATIONS

| | | |
|---|---|---|
| 1,556,127 | 1/1969 | France............................. 260/465.3 |
| 463,457 | 1/1971 | Japan................................ 252/461 |
| 1,176,233 | 1/1970 | Great Britain.................. 260/465.3 |

*Primary Examiner*—Daniel E. Wyman
*Assistant Examiner*—W. U. Shine
*Attorney, Agent, or Firm*—Morton, Bernard, Brown, Roberts and Sutherland

[57] ABSTRACT

A catalyst for the oxidation of alkanes and alkenes consists of oxides of antimony and vanadium which have been calcined and then treated, e.g., by washing with water, to remove a water-extractable component.

12 Claims, No Drawings

METHOD OF MAKING AN ANTIMONY-VANADIUM CATALYST

This invention relates to catalysts that may be used, inter alia, for the oxidation (including ammoxidation) of alkanes and alkenes. The invention is also concerned with methods of making those catalysts and with oxidation (including ammoxidation) processes utilising those catalysts.

In the complete specification of our co-pending application Ser. No. 92148, filed Nov. 23, 1970 have described and claimed a process for the production of a nitrile by the catalytic ammoxidation of an alkane. In that process, a feed gas which includes the alkane and ammonia in the vapour phase is passed at an elevated temperature below 500°C over a catalyst which comprises the oxides of vanadium and antimony and/or a compound containing vanadium, antimony and oxygen. The present invention is concerned with such a catalyst.

We have now found that beneficial results are achieved in catalytic alkane and alkene oxidation (including ammoxidation) reactions if a catalyst mixture of calcined oxides of antimony and vanadium after calcining, is treated, e.g., by water washing, for the removal of at least a part of the water-extractable vanadium component of the mixture.

For convenience the term "oxidation" used herein is intended to include ammoxidation unless the contrary is specifically stated. It is also to be understood that the mixture of calcined oxides referred to herein can be with or without a stoichiometric or non-stoichiometric compound containing vanadium, antimony and oxygen.

A first aspect of the invention thus resides in an oxidation catalyst, which is useful in the oxidation of alkanes and alkenes, and which comprises a calcined mixture of the oxides of antimony and vanadium and from which there have been removed substantially all or a part of the water-extractable vanadium component. Preferably substantially all the water-extractable vanadium component has been removed.

A second aspect of the invention resides in an oxidation catalyst which comprises a calcined mixture of the oxides of antimony and vanadium and from which, on water washing, substantially no compound of vanadium is removed.

According to a third aspect of the invention in a method of making a catalyst which is useful in the oxidation of alkanes and alkenes, a mixture consisting essentially of the oxides of antimony and vanadium is calcined and treated for the removal of at least a part of the water-extractable vanadium component, e.g., by washing with a suitable aqueous medium.

Preferably substantially all the water-extractable vanadium component is removed The above treatment is conveniently effected by washing with water for in general at least 2 hours. Longer times of up to 24 hours or even more can be used. In practice, the presence of water-extractable vanadium compounds may be detected by discolouration of the water wash. Accordingly, after water washing, the catalyst may be left in still water for a short period, e.g., of 15 to 45 minutes; of no discolouration is observed, the water washing is terminated, but should preferably be continued, if any colouring is noticed in the water in order to remove substantially all the appropriate component.

Other liquids can be used to achieve the same end as washing with water. The liquids must be capable of extracting the water-extractable vanadium component without significantly affecting the remaining catalyst material under the conditions obtaining in the treatment. For example, an aqueous inorganic alkaline solution which can form a soluble vanadate with the water-extractable component fulfills these requirements. Among these alkaline solutions are ammonium hydroxide and ammonium carbonate. Suitable acids e.g., nitric acid for example of 2 to 50 percent concentration, can be used.

The catalyst mixture prior to calcining may be prepared by mixing together antimony and vanadium oxides as finely divided dry solids. Conveniently, however, the oxides can be mixed when suspended in a liquid, which is for example aqueous, and then separated from the liquid, e.g. by evaporation or filtration, before the calcination step. It is not necessary for the catalyst mixture prior to calcining to comprise oxides and the mixture can comprise any compounds which will give rise to oxides on calcining. Furthermore, the oxides and the said compounds may be produced in situ in the liquid, e.g., by solvolysis. Thus for example: the catalyst mixture prior to calcining may be of hydroxides or hydrated oxides and these can be added as such to water or produced in situ by hydrolysis in an aqueous medium; antimony metal may be oxidised with concentrated nitric acid; or an aqueous solution of ammonium metavanadate may be hydrolysed.

When the solids have been separated, the resultant mixed product is subjected to calcining. The calcining can be performed in air, over the temperature range 300° to 950°C; however in order to promote the selectivity of the final catalyst the calcination is preferably carried out at least partly, at 700° to 900°C, and particularly 750° to 870°C, and most desirably 790° to 850°C. The activity of the resulting catalyst depends on the length of the calcining period at the relevant temperature.

Since the final oxidation state of the catalyst composition and its crystal structure and the phases present are largely determined by the final calcining treatment, it will be appreciated that it is possible to use as starting materials oxides and other appropriate compounds of antimony and vanadium in which the metals are in valency states other than those in which they are present in the final composition. Thus, tri - or penta - valent compounds of antimony can be used or tetra - or penta - valent compounds of vanadium.

The ratio of the metallic elements in the catalyyst composition can vary over a considerable range, e.g. the atomic ratio of vanadium to antimony in the "unwashed" catalyst can be 0.05:1 to 1.5:1, the preferable range being 0.1:1 to 1.0:1.

The catalyst is preferably used in the form of particles to facilitate gas/solid contact in the reactor. Within the term "particles" we wish to include powders, granules and pellets The particles may consist of the catalyst material alone; or the latter may be mixed with particles of an inert and refractory material, which may if desired be present as the major constituent with the solid catalyst. Alternatively the catalyst material may be applied as a layer on the surface of an inert support.

The above method of preparing the catalyst, without "washing", is described in the complete specification of our application Ser. No. 92,204 filed Nov. 23, 1970.

According to a fourth aspect of the invention a process for the oxidation (including ammoxidation) of an alkane or an alkene comprises passing a feed gas comprising the alkane or alkene (and, in the case of ammoxidation, ammonia) in the vapour phase and at an elevated temperature over a catalyst according to the first or second aspects of the invention or a catalyst when made by a method according to the third aspect of the invention.

The desired oxidation products can be separated by conventional methods.

The oxidation can be carried out in accordance with the processes which have been described and claimed in applications Ser. Nos. 92,204, filed Nov. 23, 1970; 92,928, filed Nov. 25, 1970; 102,067, filed Dec. 28, 1970; and 92,148, filed Nov. 23, 1970.

In the said specification, Ser. No. 92,204, we have claimed a process for the production of an unsaturated nitrile by the catalytic ammoxidation of an alkane, comprising passing a feed gas which includes the alkane and ammonia in vapour phase and at an elevated temperature below 500°C over a solid catalyst which comprises the oxides of vanadium and antimony and/or a compound containing vanadium, antimony and oxygen.

In the said specifications Ser. Nos. 92,928 and 102,067, we have claimed a process for the catalytic oxidation (excluding ammoxidation) including oxidative dehydrogenation, of an alkane in which a feed gas comprising the alkane in vapour phase is passed at an elevated temperature over a suitable catalyst and in which the partial pressure of the alkane in the feed gas is in excess of 0.20 atmospheres absolute. Preferably the temperature is less than 500°C and more preferably 380°–490°C.

In the said specification Ser. No. 92,148, we have claimed a process for the production of an unsaturated nitrile by the catalytic ammoxidation of an alkane, in which a feed gas which includes the alkane and ammonia in the vapour phase and in which the alkane has a partial pressure exceeding 0.35 atmospheres absolute is passed over a suitable solid catalyst at a temperature below 500°C.

In the present invention the alkane or alkene preferably has less than 20 carbon atoms and desirably is an acyclic alkane with 3 to 8 carbon atoms. In an ammoxidation process the product in the latter case would be an $\alpha,\beta$- ethylenically unsaturated nitrile. The oxidation reactions in the absence of ammonia produce the corresponding aldehydes or acids or appropriate anhydrides. The dehydrogenation of alkanes produce alkenes and/or dienes.

In particular the alkane is preferably propane, isobutane, or n-butane. In these circumstances the products of the oxidation in the absence of ammonia are acrolein, methacrolein and crotonaldehyde or acetaldehyde respectively; or acrylic acid, methacrylic acid and maltic acid or acetic acid respectively; or in the case of n-butane, maleic anhydride. In the dehydrogenation process the products are propylene, isobutylene, butylene and/or butadiene respectively. For the dehydrogenation of isopentane the product is isopentene and/or isoprene. In the case of ammoxidation of propane and isobutane the products are acrylonitrile and methacrylonitrile respectively.

Desirably the feed gas contains molecular oxygen, e.g., in the form of air, and it will be assumed hereinafter that this is the case.

In ammoxidation it is preferred that the volumetric ratio of ammonia to alkane in the feed gas lies between 1:40 and 1:8; and that of oxygen to alkane is between 1:50 and 1:3 and more preferably 1:9 to 1:3. In oxidation processes in the absence of ammonia the volumetric ratio of oxygen to alkane is preferably 1:3 to 1:9.

In the processes in general, the partial pressure of the alkane in the feed gas is preferably greater than 0.20 atmospheres absolute, more preferably greater than 0.35 atmospheres absolute, and most preferably greater than 0.70 atmospheres absolute. Pressures above atmospheric are preferably employed.

When the feed gas is at substantially atmospheric pressure and the oxygen is pure oxygen (as opposed to air), the alkane preferably constitutes more than 20 percent of the feed gas by volume, more preferably greater than 35 percent and most preferably greater than 70 percent.

Particularly at the operating pressures above atmospheric, it is preferred to use air to supply the oxygen for the reaction, the proportion of alkane being such as to permit the inert components of the air to be accommodated.

The oxidation processes of the invention are preferably operated on a continuous basis with mean gas feed/catalyst contact times from 0.01 to 10 seconds, particularly from 0.5 to 5 seconds. By "contact time" we mean a figure, in seconds, obtained by dividing the bulk volume of catalyst by the volumetric gas flow per second measured under ambient conditions.

The reactor may be of the fluidised, moving or static bed type and the catalytic oxidation reaction may be arranged to take place isothermally or adiabatically. Preferably the required product or products are removed from the exit gases along with waste products such as carbon dioxide, and the remaining gases, constituted primarily by unconverted alkane or alkene and oxygen, are mixed with appropriate quantities of fresh reactant gases and recycled to the inlet of the reactor.

The invention will now be further explained in relation to the specific Examples for which data is quoted in the table below.

In Examples 1 to 10 and 13 the catalyst was prepared as follows. Antimony metal was added to concentrated nitric acid, the rate of addition being adjusted to maintain the solution temperature at 80°C. After the addition of antimony was completed, the resulting antimony oxide suspension was boiled to decompose the excess nitric acid. The antimony oxide slurry was then cooled to room temperature.

In a separate flask ammonium metavanadate was added to 1 percent hydrochloric acid. The orange slurry formed was mixed with the antimony oxide slurry and the solution evaporated to dryness. During the evaporation, the slurry was continuously stirred.

The damp solid residue was dried at 150°C for 16 hours and then calcined at 650°C for 4 hours in air, mixed with "STEROTEX" as lubricant, pelleted and finally calcined at the temperature quoted in the table in air for 1 hour.

After calcination, the catalyst was washed in a continuous stream of water for 24 hours. At the end of this period the pellets were left in still water for a short period and no discolouration of this water was observed.

A vapour phase feed gas consisting of 36 percent propane, 4.5 percent ammonia, 57.5 percent air and 2 percent impurities was passed into a stainless steel reactor containing the indicated catalyst. Temperature control was achieved by immersing the reactor in a molten salt bath (53% $KNO_3$, 40% $NaNO_2$ and 7% $NaNO_3$). The average reactor pressure was 35 p.s.i.a.

The stainless steel reactor used in Examples 1 to 9 was 48 inches long by 0.4 inches internal diameter and this was charged with 100 mls of granular catalyst (10 to 16 mesh BSS). The reactor used in Example 10 was 10 feed long by 1.1 inches internal diameter. This latter was charged with 2 litres of one-eighth inch × one-eighth inch pellets.

In Examples 11 and 12 the catalyst was prepared with the raw materials:

The results in the table indicate that good conversion of propane was obtained with a significantly high selectivity to acrylotnirile. Selectivity is defined as the number of moles of the nitrole produced per mol of the alkane consumed expressed as a percentage, whilst conversion is defined as the difference in the amounts of the hydrocarbon in the feed gas and exit gas divided by the amount of hydrocarbon in the feed gas. We have found that if the ammoxidation of propane or isobutane is carried out within the temperature range of 380° to 500°C, preferably 400° to 480°C and particularly 420° to 470°C according to the invention the selectivity to the product nitrile is at an optimum. Below 380°C and above 500°C the selectivity tends to be reduced markedly. In general, this is so also for the production of other nitriles according to the invention.

If the above Examples are carried out with a feed gas not containing ammonia, then broadly similar results are achieved.

| Example No. | Weight % $V_2O_5$ | Temperature of calcination °C | Salt bath temp. °C | Space velocity Hours$^{-1}$ | % Conversion of propane | % Selectivity to acrylonitrile |
|---|---|---|---|---|---|---|
| 1 | 20 | 800 | 475 | 2,000 | 8.5 | 60 |
| 2 | 25 | 800 | 455 | 2,000 | 11.0 | 57 |
| 3 | 27.5 | 810 | 457 | 2,500 | 10.0 | 62 |
| 4 | 27.5 | 810 | 450 | 2,000 | 10.0 | 59 |
| 5 | 27.5 | 820 | 454 | 2,000 | 10.0 | 60 |
| 6 | 27.5 | 820 | 449 | 1,000 | 12.0 | 59 |
| 7 | 30 | 810 | 455 | 2,000 | 9.7 | 60 |
| 8 | 30 | 830 | 450 | 1,000 | 11.0 | 60 |
| 9 | 32.5 | 810 | 460 | 2,000 | 9.8 | 60 |
| 10 | 30 | 810 | 421 | 2,000 | 9.7 | 59 |
| 11 | 27.5 | 810 | 450 | 2,000 | 9.7 | 58 |
| 12 | 27.5 | 810 | 457 | 2,500 | 10.0 | 60 |
| 13 | 27.5 | 790 | 415 | 2,000 | 10.0 | 59 |

| | | |
|---|---|---|
| $Sb_2O_3$ | — | 3,625 grammes |
| $V_2O_5$ | — | 1,375 grammes |
| $H_2O$ | — | 3,800 mls |
| 70% $HNO_3$ | — | 3,800 mls |

The antimony oxide and vanadium pentoxide powders were mixed and then placed in a 20 litre flask. The concentrated nitric acid was added to the powders to form a slurry which was stirred continuously until all the acid had been added. The slurry was boiled to drive off all excess liquid and the damp cake was dried at 150°C for 8 hours. Finally, the cake was calcined at 650°C for 12 hours.

The calcined cake was crushed, mixed with 1.5 percent "STEROTEX" and pelleted. The pellets were heated slowly to 810°C, maintained at this temperature for 1 hour, cooled to 500°C and removed from the furnace. They were then placed in a glass tower and a stream of hot water at 50°C was passed over them for 24 hours. The pellets were dried at 300°C for 1 hour and a small sample was placed in water for 30 minutes. The water did not turn yellow or green. Thus the washing/drying cycle did not need to be repeated.

A sample of this cataylst was crushed to 10 to 16 mesh BSS and 100 mls were charged to a stainless steel reactor with an inside diameter of three-eighth inch. The reactor was heated as before in a molten salt bath whilst an inlet gas of 38 percent propane, 4.5 percent ammonia and 57.5 percent air was fed to the reactor, the average reactor pressure being, as before, 35 psia.

The weight percentages of $V_2O_5$ which are listed in the table are of the catalyst mixture prior to washing.

We claim:

1. In a method of making a catalyst for the oxidation of alkanes and alkenes, said catalyst consisting essentially of the calcined oxides of vanadium and antimony, by a high temperature calcination at 700° to 900°C. of antimony and vanadium oxides or their compounds which are convertible by calcining to their oxides to provide a calcined mixture having an atomic ratio of vanadium to antimony of 0.05:1 to 1.5:1, wherein the improvement comprises washing the calcined mixture with water to provide an antimony and vanadium-containing catalyst suitable for the oxidation of alkanes and alkenes.

2. A method for making an antimony and vanadium-containing catalyst for the oxidation of alkanes and alkenes comprising calcining antimony and vanadium oxides or their compounds which are convertible by calcining to their oxides, to provide a mixture containing the calcined oxides of vanadium and antimony, said mixture having an atomic ratio of vanadium to antimony of 0.05:1 to 1.5:1, and washing the calcined mxiture with water to provide an antimony and vanadium-containing catalyst suitable for the oxidation of alkanes and alkenes.

3. The method of claim 2 in which the water-washing of the mixture is washed until the calcined mixture does not discolor still water when placed therein.

4. The method of claim 2 in which the water-washing of the mixture is with an aqueous inorganic alkaline solution.

5. The method according to claim 2 in which the calcination is carried out, at least partly, at temperature between 750° and 870°C.

6. The method according to claim 5 in which the calcination is carried out, at least partly, at a temperature between 790° and 850°C.

7. The method according to claim 2 in which the atomic ratio is 0.1:1 to 1.0:1.

8. The method of claim 4 in which the aqueous inorganic alkaline solution is ammonium hydroxide or ammonium carbonate in water.

9. The method of claim 2 in which the water-washing of the calcined mixture is with an aqueous inorganic acid.

10. The method according to claim 9 in which the acid is nitric acid.

11. A catalyst prepared by the method of claim 2.

12. A catalyst prepared by the method of claim 3.

* * * * *

UNITED STATES PATENT OFFICE
CERTIFICATE OF CORRECTION

Patent No. 3,860,534          Dated January 14, 1975

Inventor(s) NORMAN HARRIS, et al.

It is certified that error appears in the above-identified patent and that said Letters Patent are hereby corrected as shown below:

Column 1, line 57, insert a period after "removed."

Column 1, line 65, delete "of" second occurrence and insert -- if --.

Column 2, line 25, underscore "in situ".

Column 3, lines 62 and 63, correct the spelling of --maleic--

Column 5, line 14, change "feed" to --feet--

Column 6, line 3, delete "acrylotnirile" and insert therefor --acrylonitrile--.

Column 6, line 4, delete "nitrole" and insert therefor --nitrile--

Column 6, the last figure in the column in the table under "% Selectivity to acrylonitrile" should be --57--.

Column 6, lines 55 and 56, correct the spelling of "mixture"

Column 6, line 66, after "at" second occurrence insert -- a --.

Signed and Sealed this second Day of September 1975

[SEAL]

Attest:

RUTH C. MASON
*Attesting Officer*

C. MARSHALL DANN
*Commissioner of Patents and Trademarks*